Nov. 24 1925.

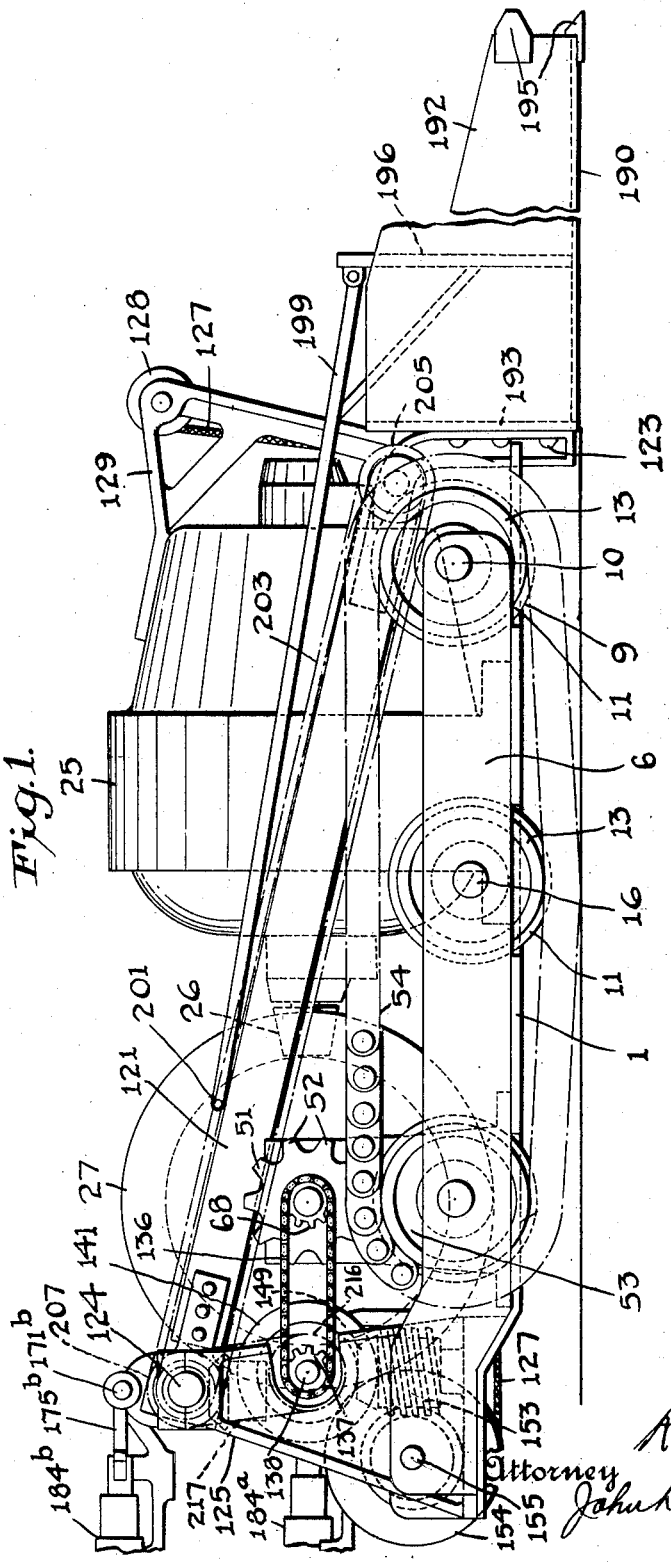

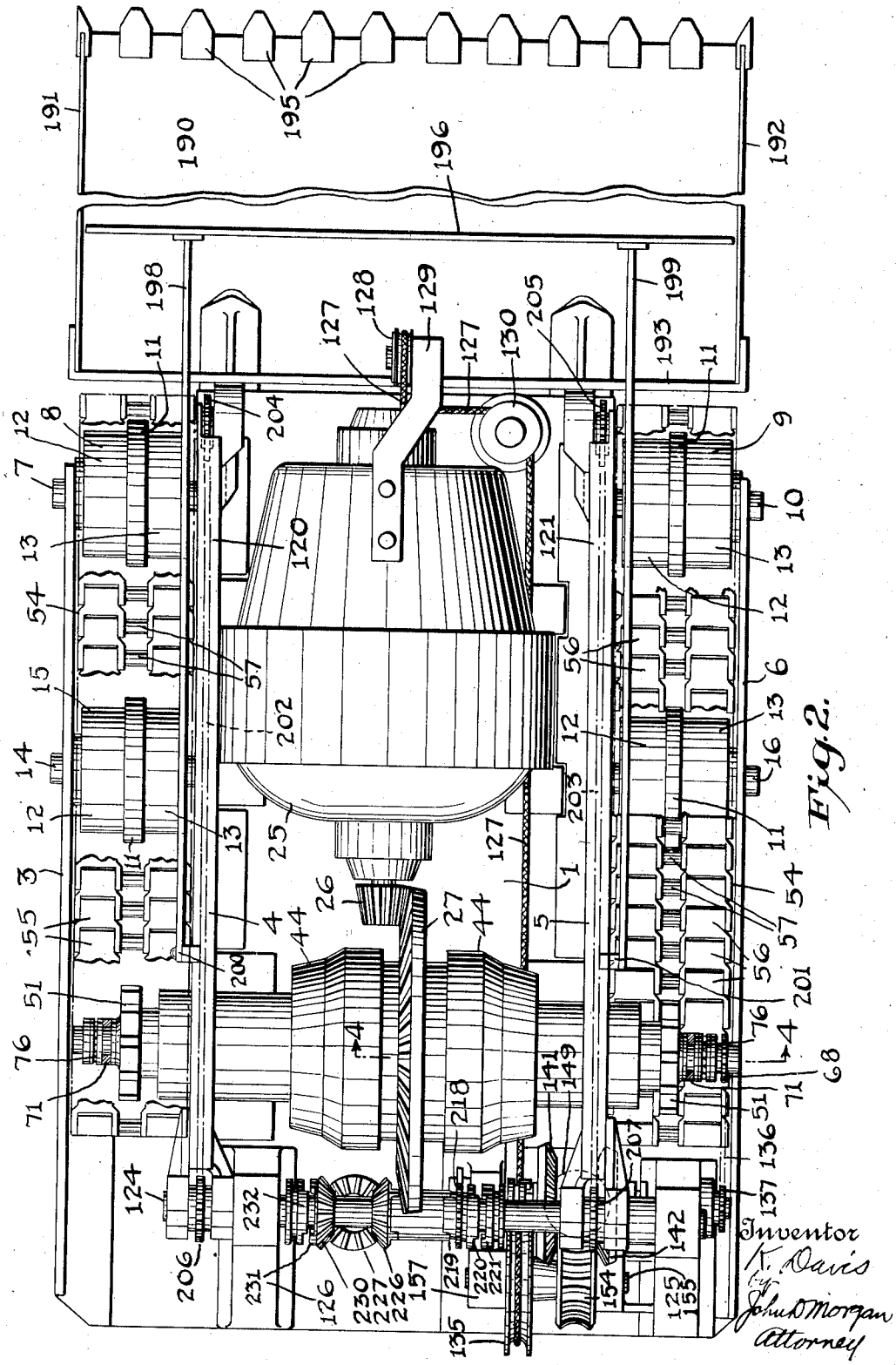

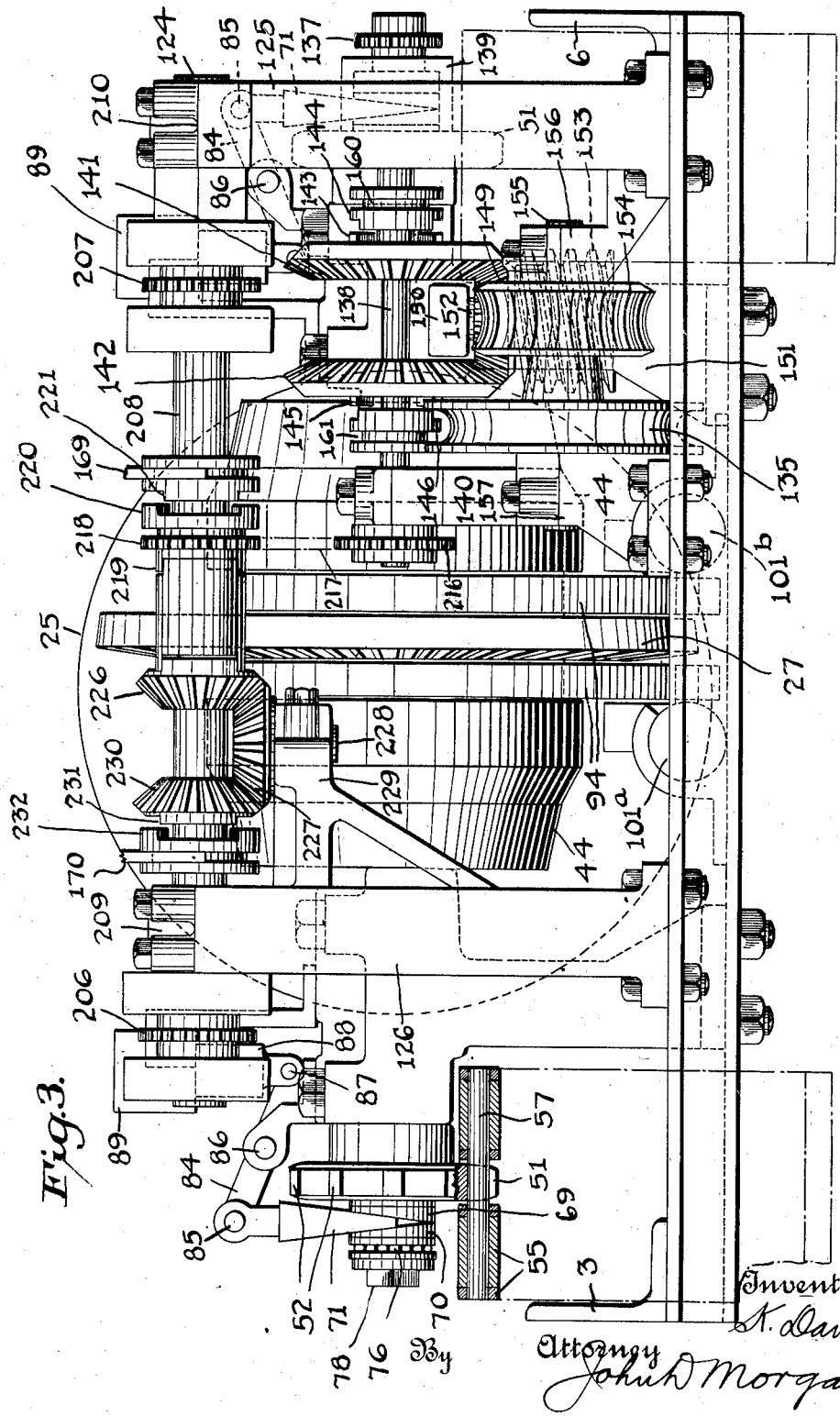

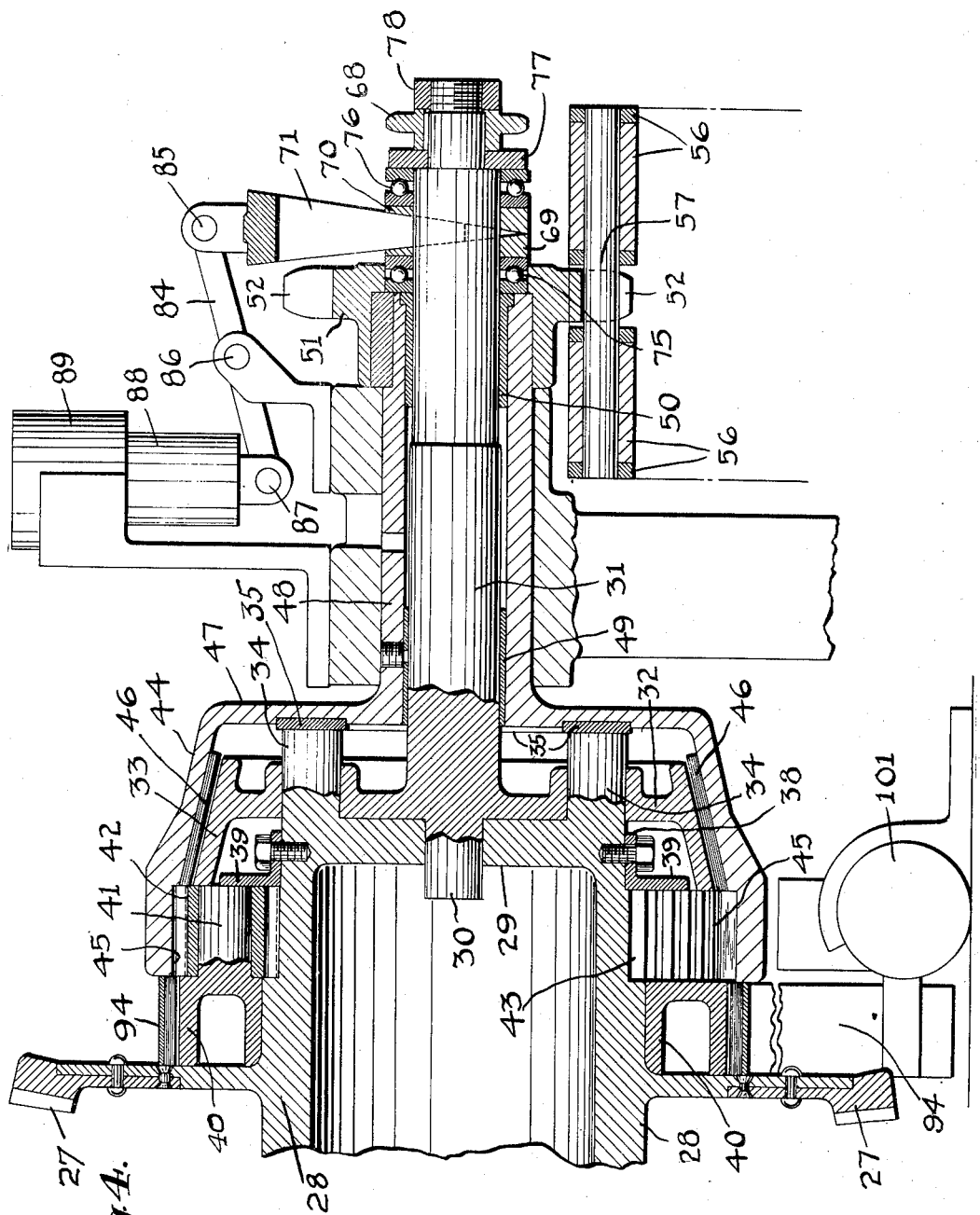

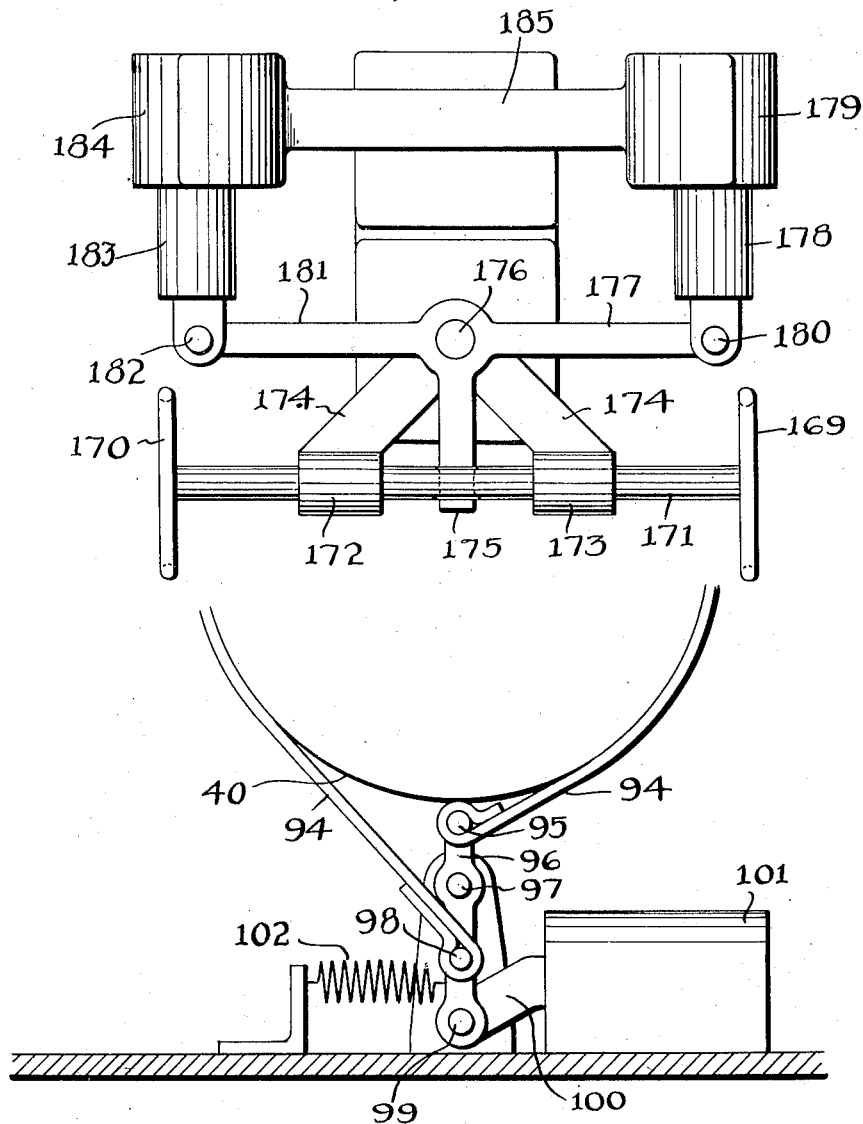

K. DAVIS 1,562,872

DISTANT CONTROL FOR AUTOMOTIVE MACHINES AND MATERIAL HANDLING MACHINES

Filed Feb. 17, 1921.    7 Sheets-Sheet 6

Inventor
K. Davis
By Attorney
John D. Morgan

Nov. 24, 1925.
K. DAVIS
1,562,872
DISTANT CONTROL FOR AUTOMOTIVE MACHINES AND MATERIAL HANDLING MACHINES
Filed Feb. 17, 1921    7 Sheets-Sheet 7
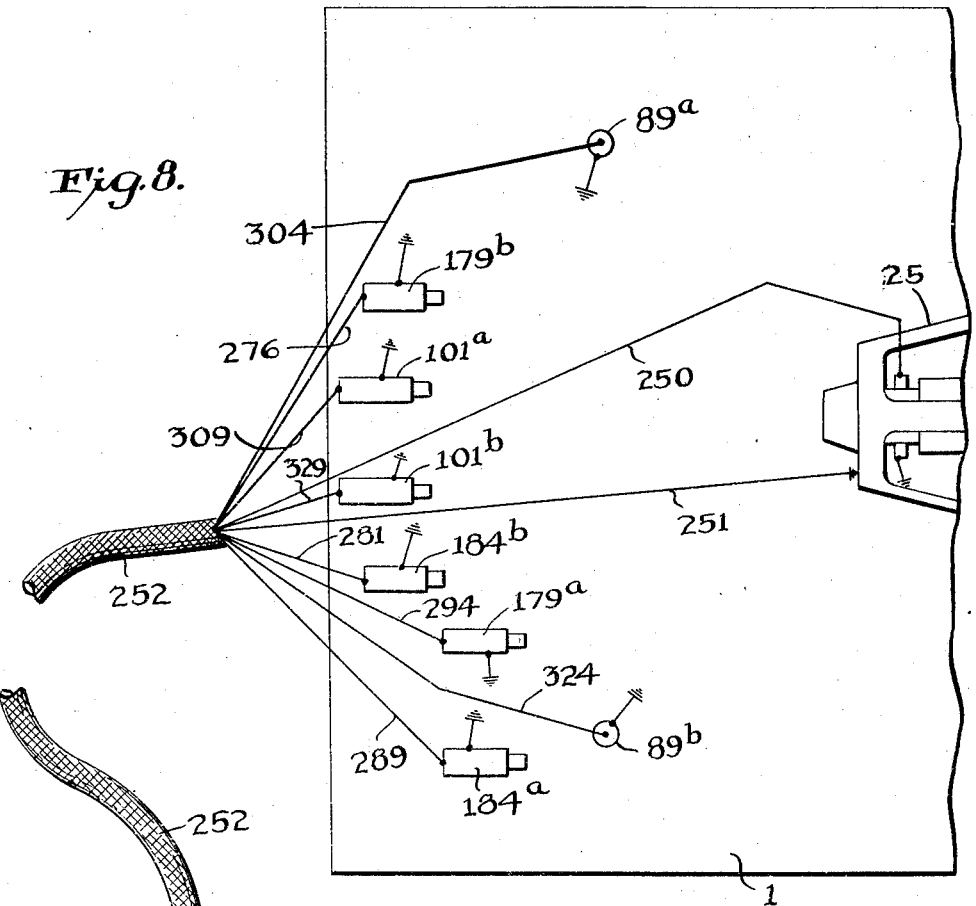
Fig.8.
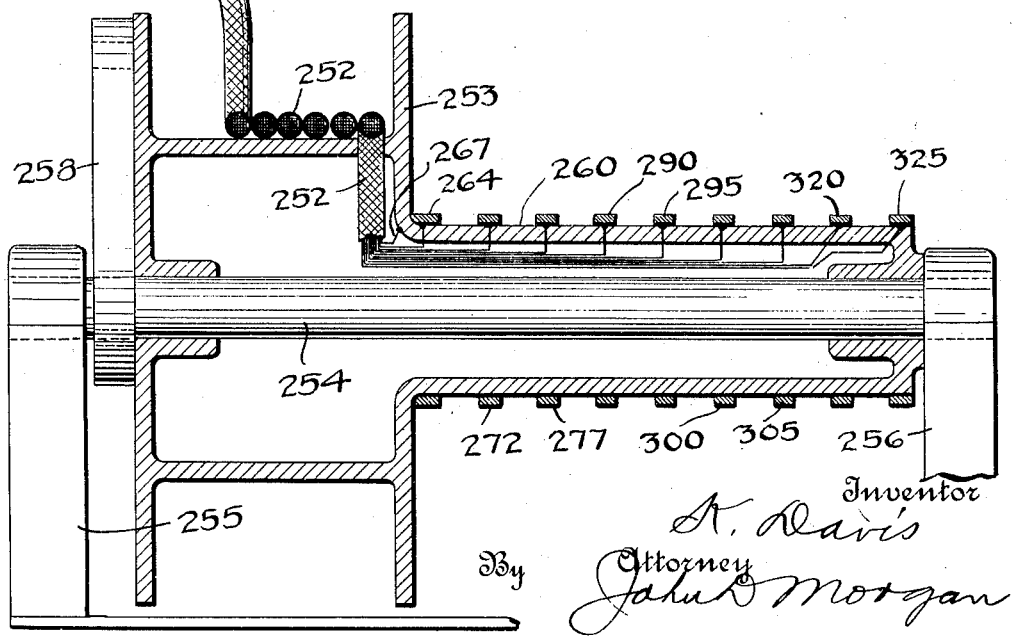

Patented Nov. 24, 1925.

1,562,872

UNITED STATES PATENT OFFICE.

KENNETH DAVIS, OF ST. BENEDICT, PENNSYLVANIA, ASSIGNOR TO REMBRANDT PEALE, OF NEW YORK, N. Y.

DISTANT CONTROL FOR AUTOMOTIVE MACHINES AND MATERIAL-HANDLING MACHINES.

Application filed February 17, 1921. Serial No. 445,701.

*To all whom it may concern:*

Be it known that I, KENNETH DAVIS, a citizen of the United States, residing at St. Benedict, in the county of Cambria and State of Pennsylvania, have made certain new and useful Improvements in Distant Controls for Automotive Machines and Material-Handling Machines, of which the following is a specification.

The invention relates to a novel material loading, carrying and unloading machine, and to a novel distant control for this and other machines.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a side elevation of a machine embodying the invention;

Fig. 2 is a top plan, corresponding to Fig. 1;

Fig. 3 is an end elevation, looking at Figs. 1 and 2 from the left;

Fig. 4 is a central vertical longitudinal section, on an enlarged scale, taken substantially on the line 4—4 of Fig. 1, looking in the direction of the arrows;

Fig. 5 is a detached, top plan, on an enlarged scale, of the solenoid-operated, clutch-controlling mechanism for the shovel-actuating and pusher-blade-actuating mechanisms, the same being shown in fragmentary elevation, connected in the machine, at the left hand end of Fig. 1;

Fig. 6 is a fragmentary elevation, greatly enlarged of the solenoid-operated mechanism for controlling the band brakes or clutches of the tread-operating mechanism, the same being shown in end elevation in its connection in the machine at the bottom of Fig. 3;

Fig. 8 is a fragmentary, diagrammatic plan of the machine, showing the mechanism which controls the automotive machine with its circuits, and also showing the control circuits, with their mountings and connections at the controlling station, in vertical transverse section.

Figure 7:
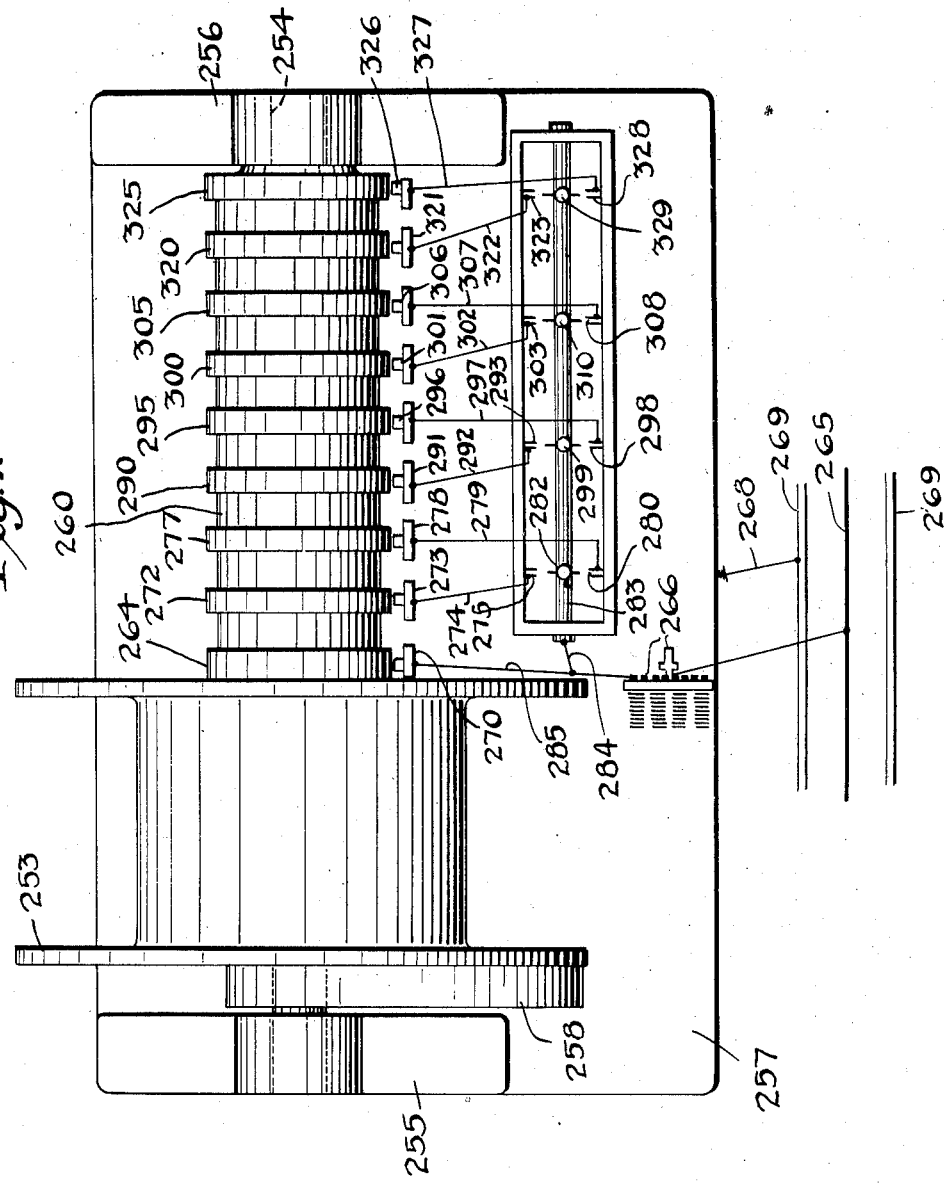
Fig. 7 is a top plan of the operating mechanism for the distant control.

The invention comprises a distant control mechanism and system for an automotive working machine, of which the material loading, carrying and unloading machine is an example, the distant control at the will and by the setting of the operator, who is located at a distant station, starting, controlling and directing and stopping all the various mechanisms and functions of the machine, including in the exemplified application to the present machine, the loading and unloading mechanisms and functions, as well as causing the machine to travel forwardly or backwardly and to turn to the right or the left.

In the embodied exemplification, the distant control comprises a system of electrical circuits controlling a motor, and also controlling and operating a system of clutches, by solenoids or other electro-magnetic means, from the operator's distant station, and also preventing conflicting or mischievous opration of the controls by the operator.

It further comprises automatically operating means for taking care of the paying out and taking in of the cables, and other features cooperating toward the practical application and operation of the system or mechanism.

The material loading, carrying and unloading mechanism shown herein is a machine having a shovel at its forward end, the machine pushing the shovel with a pile of loose coal or other material, lifting the loaded shovel slightly to free the load from the pile, and then backing away, wheeling, going forward, straight ahead or turning in any desired direction, and dumping its load at the desired or required place.

The controlled, material-handling machine, as embodied, comprises a single motor which operates the automotive mechanism and the shovel operating mechanisms, with a system of solenoid-operated clutches controlled by the operator at the distant station, as already described.

It will be understood that the foregoing summarized prefatory description, as well as the following detailed description are illustrative and explanatory and not restrictive of the invention. Certain features of the invention not touched upon heretofore will be set forth in connection with the following detailed description.

The material-handling machine in its design, structure and manner of operation is well capacitated for work in coal seams or veins, and especially in thin or low seams, taking the coal from the mine bottom where it has fallen when dislodged from the vein, and carrying it to a mine car, or to a scraper line, mechanically operating conveying chute, or other place of convenient deposit, and automatically discharging it thereto. The machine is especially adapted to pick its way around roof-supporting props, pillars of other obstructions, and can travel in any direction, turning within its own length when necessary.

By reason of the distant control, the operator is not obliged to ride in the machine, which in a low vein keeps him in cramped position, and frequently at a disadvantage in observing the operation of the machine so as to control it to the best advantage.

Referring now in full detail to the embodiment of the invention illustrated by way of example in the accompanying drawings, and referring primarily to the loading, carrying and unloading machine, it is shown comprising (Figs. 1 and 2) a bed plate 1, to which are fixed at either side, pairs of longitudinally disposed, vertically projecting plates 3 and 4 and 5 and 6, which serve as supports for parts of the automotive and other mechanisms. Supported in the pair of plates 3 and 4, at the forward end of the machine, is a shaft 7, and journaled thereon between the plates 3 and 4, is a guiding and backing roller 8, over which the forward end of the caterpillar tread on that side of the machine runs. On the opposite side of the machine, and located between the plates 5 and 6 is a short shaft 10, and journaled thereon is a guiding and backing roller 9, over which the forward end of the caterpillar tread at the corresponding side of the machine runs.

The tread, as embodied, consists of two sets of pivoted links, extending side by side, the pivot pins being exposed at the center to constitute a part of the drive, as later more fully described. The rollers 8 and 9 are shaped to have a central guiding portion 11 between the two side rows of links and to have backing portions 12 and 13 behind the links to hold them to position.

At or near the central part of the machine, a shaft 14 is supported in the plates 3 and 4, and journaled upon the shaft is a guiding and backing roller 15, which engages with the lower or traction reach of the caterpillar tread to hold it to its work. On the opposite side of the machine is a corresponding shaft 16, likewise supported in the plates 5 and 6, and journaled thereon is a guiding and backing roller 17, engaging with the lower or traction reach of the caterpillar tread on that side of the machine to likewise hold it to its work.

At the rear end of the caterpillar treads are located the driving mechanism therefor, and for the sake of clearness, the description will begin with the motor and follow through the driving connections.

A motor 25 is supported upon the floor plate 1 of the machine, and fixed to the motor shaft is a beveled driving pinion 26. Meshing with the pinion 26 is a gear wheel 27 (Figs. 1, 2, 3 and 4), which is fastened to or integral with a hollow cylindrical drum 28. In this embodiment, both the traction mechanisms and the shovel-operating mechanisms are operated through this one driving mechanism. The driving gear wheel 27 is located centrally of the drum 28, and the construction and connections at each side are preferably the same, one side being shown partly in section and on an enlarged scale in Fig. 4, and for the sake of clearness a single description of the mechanisms will be given.

The drum 28 is provided at each end with a head 29 (Fig. 4), the head 29 being centrally apertured to receive the end 30 of a shaft 31. Fixed to the shaft 31 is a cylindrical plate or disc 32, which is in contact with or closely contiguous to the head 29 of the drum 28. The disc 32 terminates at its outer periphery in a conical or conoidal ring 33, the outer periphery of which forms one of the frictional driving surfaces for the treads, as will be later fully described. The plate or disc 32 has openings therein through which project pins or short shafts 34, preferably four in number, which are fixed to or integral with the head 29 of the drum 28. By this construction there is provided relative longitudinal movement between the drum 28 and the shaft 31, but they will always rotate together. A bearing ring 35 for the ends of the shafts or pins 34 may be employed if desired.

Sleeved upon the periphery or outer cylindrical surface of the drum 28, at either side of the gear wheel 27 is a brake ring 40, adapted to have either relative rotary movement with respect to the drum or to rotate therewith to effect different movement of the treads. Extending outwardly from the side of the brake ring 40 are a plurality of stub shafts 41, preferably three in number. On each of the shafts 41 is journaled a pinion 42. A gear ring 43 is fixed to, or is formed upon, the periphery or external surface of the drum 28, the pinions 42 being in mesh with the gear ring 43. A retaining ring 39 has a cylindrical footing ring 38, which is bolted to the drum 28, the retaining ring keeping the brake ring 40 and pinions 42 in position.

Inclosing the end of the drum 28, the cone ring 33, and the other mechanisms just described, excepting the brake ring 40, is a housing 44, having the general form of a hollow truncated cone, with its top or outer end 47 closed and terminating in a sleeved driving connection 48. At its inner, open end, the housing 44 abuts on the brake ring 40, and on its inner cylindrical surface there is formed an internal gear ring 45, with which meshes the pinions 42. It will be noted that pinions 41 are thus in mesh with gear ring 43 on drum 28 and with gear ring 45 on housing 44.

The housing 44 is provided on its inner surface, and within the gear ring 45, with an internal conical friction ring or surface 46, adapted to cooperate with the friction cone ring 33, in a manner hereinafter to be described.

The housing 44 is provided with a head 47, which terminates in a central hollow sleeve 48, which sleeve is journaled in the machine frame, and also incloses and journals the shaft 31. Bearing rings or sleeves 49 and 50 may be employed to minimize the friction between shaft 31 and sleeve 48. Keyed on sleeve 48 is a driving sprocket wheel 51, having teeth 52, which mesh with the corresponding caterpillar tread to drive it. The sprocket wheel 51 works opposite or against a tread guiding and backing roller 53, which is the same or similar to the rollers already described, and over which the rear end of the caterpillar tread 54 runs, the roller 53 serving to hold the tread both to the driving sprocket 51 and to traction position on the machine.

The embodied form of caterpillar or friction tread, extending along the machine frame at either side thereof, comprises a double series of ground or floor-engaging links 55 and 56, each link being pivotally mounted on two adjacent pivot pins 57, each link on one pin nesting the adjacent link which is pivoted on the same pin, and on the other pin being nested by the adjacent link pivoted on that pin (Fig. 2). The central parts of the pivot pins 57, between the two series or rows of links are free and clear, and the teeth 52 of the sprocket wheels 51 engage with the pins 57 in this free space to drive the tread. Each of the rollers 53 is journaled on a shaft 58 which is supported in the side plates 3 and 4 and 5 and 6, respectively, at either side of the machine, similarly to the guiding and backing rollers already described.

Fixed to the shaft 31 located at the right-hand side of the machine in the drawings, to rotate therewith, is a sprocket wheel 68, from which are driven the shovel raising, lowering and holding and the pusher blade operating mechanisms, which will be later described. In the present embodiment, this shaft 31 and the sprocket wheel 68 are continuously driven, said mechanisms being controlled by clutches interposed at a later point in the driving mechanism.

Means are provided for imparting longitudinal movement to both shafts 31, to selectively and independently control or modify the drive from the gear wheel 27 to the two caterpillar treads. In the embodied form of such means, devices are provided at each side of the machine for imparting longitudinal movement to the corresponding shaft 31. In said embodied form, two cooperating, non-rotating collars 69 and 70 are mounted loose on shaft 31 (Fig. 4). These collars are of triangular form on the cross-section shown in Fig. 4, and have their adjacent faces inclined from top to bottom toward each other, but have their outer faces parallel to each other and perpendicular to the axis of the shaft 31. Between the rings 69 and 70 a longitudinally-movable, bifurcated wedge 71 is inserted from above, the wedge straddling the shaft 31. Thrust bearings are provided at either side of the rings 69 and 70, comprising a ball bearing 75 between the ring 69 and the external end of the sleeve 48, and a ball bearing 76 between the ring 70 and a washer 77 against which washer the hub of the sprocket wheel 68 abuts. Sprocket wheel 68 is preferably splined on shaft 31 and is held in place by a nut 78.

In accordance with certain features of the invention, a distant control is provided to control the action of the driving motor on the caterpillar treads to travel the machine backwards or forwards, or to turn it to either side. As embodied, and according to one feature of the invention, a solenoid-equipped control of the kind described is provided. As a part of said control, and as embodied, a lever 84 is pivotally connected at 85 to the head of the wedge 71, the lever 84 being pivotally supported at 86 upon the machine frame. At its opposite end 87, the lever 84 is pivotally connected to the core 88 of a solenoid 89, the connections therefrom to the other parts of the control mechanism being later described. The solenoids may be provided with adequate restoring springs in a known manner.

The controlling mechanisms for the respective brake rings 40, by which the backward travel of the corresponding caterpillar treads is effected, in accordance with certain features of the invention, are a part of the distant control for the entire machine. This mechanism comprises a brake band 94 (Figs. 1 and 6), encircling the exterior of the corresponding brake ring 40. One end of the brake band 94 is pivotally connected at 95 to a lever 96. Lever 96 is pivotally supported at 97 on the machine frame. The other end of brake band 94 is pivotally connected at 98 to the lever 96, and the lever at its opposite end 99 is pivotally connected to the core 100 of a solenoid 101, the electrical connections therefrom to the remander of the control mechnism being later described. A spring 102 may be provided to insure the brake band throwing off when the solenoid is de-energized.

The manner of operation of the mechanism is substantially as follows:—

When the machine is standing still, that is, when neither of the caterpillar treads is being driven, but the shovel-operating mechanism is being driven, as would be the case when the shovel is being raised or lowered, or the load is being pushed out of the shovel, the shafts 31 are rotated to drive sprocket wheel 68, while the sleeves 48 are at rest. At this time, wedges 71 are in retracted position, and the cone rings 33 are out of engagement with the cooperating friction bands 46 on the respective housings 44.

Under these conditions, the motor is driving the gear wheel 27, and drum 28 rotates with it, thereby rotating shafts 31 by reason of the pins or lugs 34 projecting through the plate 32. Sprocket wheel 68 rotates with its shaft 31. Brake bands 94 are disengaged from brake rings 40, and the brake rings are free to rotate. Thus when the drum 28 rotates, pinions 42 will also rotate, and brake rings 40 will rotate on the drum 28, the pinions 42 rolling on the interior gearing 45, and the housing 44 will remain at rest and there will be no drive of the caterpillar treads through their sprocket wheels 51.

If it is desired to drive the machine in a given direction, say forward, the wedges 71 will be driven to their inner or downward position in Fig. 4, and shafts 31, heads 32 and cone rings 33 will be moved (to the right in Fig. 4 and to the left on the other side of the machine), the pins 34 preserving the rotational drive of the drum 28 on the shafts 31. This movement brings cone rings 33 into engagement with their friction rings 46 on the interior of the housings 44, locking the entire mechanism together, and drum 28, shafts 31 and housings 44 will rotate together. This will drive the two caterpillar treads in, say, the forward direction. The sprocket wheel 68 will also be driven, the action of the shovel-operating devices being determined by the clutches or other controls, later to be described. The pinions 42 are at rest, due to the housings 44 and drum 28 rotating together, and brake rings 40 being left free from their brake bands 94.

When it is desired to drive either of the caterpillar treads in the opposite direction, the corresponding wedge 71 is retracted, and that cone ring 33 will slip inwardly (to the left in Fig. 4) out of driving engagement with its friction ring 46 on the housing 44, as it is not held to its drive and the load on the sprockets 51 is comparatively heavy. A restoring spring could be employed to push cone ring 33 away from friction band 46, but usually in practice will not be found necessary.

The corresponding brake band 94 is now caused to clutch brake ring 40, holding it against rotation, and as drum 28 is rotating in the same direction as heretofore, pinions 42 will be caused to rotate, and will rotate the corresponding housing 44 in the opposite direction to the drum 28, but at a slower speed, due to the reduction resulting from the difference in the size of or number of teeth on the gear rings 43 and 45, which are located on the drum 28 and on the housing 44, respectively. During these changes in the drive for the treads, the gear 68 is running continuously in one direction, to drive the shovel-operating mechanism, which is controlled elsewhere as already described.

The shovel-raising, lowering and holding mechanism and the driving and controlling mechanism therefor, as embodied, comprise arms 120 and 121, fixed to the shovel at the rear end 123 thereof (Figs. 1 and 2), extending backwardly along either side of the machine, and pivotally supported at the rear end of the machine upon a shaft 124. Shaft 124 is journaled upon pillars 125 and 126, extending upwardly from the rear end of the bed 1 of the machine at either side thereof.

The embodied form of means for elevating and lowering the shovel comprises a rope or cable 127, attached to the shovel at its rear end and preferably near its bottom. The cable runs upwardly over a sheave or pulley 128, which is rotatably journaled on a bracket 129, fixed to the casting of the motor 25. The cable thence runs downwardly and over a series of guiding and direction changing pulleys or sheaves 130 and back along the machine to a drum 135, located at the rear.

Means are provided for starting and stopping the drum 135, and for rotating it in either direction, to raise or to lower the shovel or to hold it at rest in any position, as might be desired. In the embodied form of such means, a sprocket chain 136 (Figs.

2 and 3) runs over sprocket wheel 68 and over a sprocket wheel 137, fixed on a shaft 138, which shaft is journaled at 139 and 140 in the machine frame.

The direction-reversing drive for the drum 135, as embodied, comprises two beveled gear wheels 141 and 142, loosely journaled on the shaft 138. Gear wheel 141 is provided with a clutch member 143 and a cooperating clutch member 144 is mounted on shaft 138 to rotate therewith, and is slidable on the shaft into and out of engagement with the clutch member 143 upon gear wheel 141. In like manner, beveled gear wheel 142 is provided with a clutch member 145, and a cooperating clutch member 146 is mounted on shaft 148 to rotate therewith and is slidable on the shaft into and out of engagement with the clutch member 145 on beveled gear wheel 142.

The beveled gear wheels 141 and 142 both mesh with a bevel pinion 149, which is fixed on a shaft 152, journaled at 150 and 151 in the machine frame. Fixed on shaft 152 is a worm 153, with which meshes a worm wheel 154, which is fixed on a shaft 155, journaled at 156 and 157 in the machine frame. The drum 135 is likewise fixed to shaft 155, and by alternatively throwing in the clutches 144 and 146, is driven in either direction to wind or unwind the cable 127 of the drum. The worm drive serves to give the desired reduction in speed and increase in power, and when both clutches are out will also hold the shovel in any position wherein it has been brought to rest.

The clutches 146 and 147 may be thrown into mesh alternatively with their respective beveled gear wheels, or they may be both left in neutral position. It will be noted that the gear wheels 141 and 142 are connected to the bevel pinion 149 so as to drive it in opposite directions, and by throwing them in or out alternatively the shovel may be raised or may be lowered gradually and without slamming.

Connections constituting part of the distant control mechanism are provided for the shovel controlling mechanism, and are shown connected up in Fig. 1 and in detached detail in Fig. 5. The clutch members 144 and 146 are provided respectively with annular grooves 160 and 161, into which project, respectively, the ends of yokes 169 and 170. These two yokes are carried at the opposite ends of a shaft 171, which is mounted to move longitudinally in bearings 172 and 173, supported on a bracket 174, which is mounted upon the machine frame. Rod 171 is apertured intermediately, and preferably centrally, of its ends, and the end of an arm 175 of a three-armed lever works in this aperture. This lever is pivoted at 176 on the machine frame.

To the end of the arm 177 of the lever there is pivoted at 180 the core 178 of solenoid 179. The other arm 181 of the lever is pivotally connected at 182 to the core 183 of the solenoid 184. The solenoids are mounted on a bracket 185 carried on the machine frame. The usual and adequate restoring springs for the solenoids will be provided if desired or required. When the current is off both solenoids, the mechanism will be brought to the position of Fig. 5, and both the clutch members 144 and 146 will be in neutral position, and the shovel will be held at rest. When one of the solenoids is energized, the shovel will be moved in one direction, and when the other solenoid is energized, the shovel will be moved in the opposite direction.

The means for unloading the shovel comprise a pusher blade reciprocable to and fro between the rear and the front of the shovel, and a drive therefor is provided from the shafts 31, together with a distant control device, which is a part of the general distant control mechanism for the entire machine.

As embodied, the shovel itself is preferably of rectangular form, having a bottom 190 and sides 191 and 192 and a back 193, and the forward edges thereof are preferably provided with points 195 which will facilitate its passing into the material. A pusher blade 196 is located within the shovel, and is disposed vertically and across the shovel. Fixed to the blade at or near either side thereof, are rods 198 and 199 which extend backwardly along the machine, and are pivotally connected, respectively, at their rear ends 200 and 201 to sprocket chains 202 and 203. The sprocket chains, respectively, run over guiding sprocket wheels 204 and 205, journaled, respectively, in the forward ends of the shovel supporting arms 120 and 121. At their rear ends the sprocket chains run, respectively, over driving sprockets 206 and 207 fixed on a shaft 208, which is journaled in bearings at 209 and 210 on the machine frame.

In the embodied form of driving means for the pusher blade operating mechanism, a sprocket wheel 216 is fixed on the left-hand end of shaft 138 (in Fig. 3), a sprocket chain 217 running thereover and over a sprocket wheel 218, which is fixed on a sleeve 219, which sleeve is loose on shaft 208. Sleeve 219 has fixed thereto a clutch member 220, and cooperating therewith is a clutch member 221, which rotates with, but is slidable along, shaft 208 into and out of engagement with clutch member 220. When clutch members 220 and 221 are in engagement, shaft 208 is driven in one direction, thereby driving the pusher blade either forwardly or backwardly within the shovel.

To drive the pusher blade in the opposite direction, as embodied, a beveled pinion 226 is sleeved upon shaft 208, and meshes with a pinion 227, which is mounted on a stub shaft 228, the shaft being journaled in a bracket 229, carried on the machine frame. Meshing also with beveled gear 227 is a beveled gear 230, mounted loosely on shaft 208. Fixed to gear wheel 230 is a clutch member 231. A clutch member 232 is mounted on shaft 208 to rotate therewith, but is slidable therealong into and out of engagement with the clutch member 231.

To drive the shaft 208 in the opposite direction from that in which it is driven by clutch members 220, 221, the latter are thrown out and clutch members 231 and 232 are thrown into engagement, and by reason of the sprocket wheel 218 and the bevel gear 230 running in opposite directions (due to the connection through the beveled gears 226 and 227), shaft 208 will be rotated in the opposite direction and the pusher blade 196 will be moved in the opposite direction. When both clutches 220, 221 and 231, 232 are in neutral, the pusher blade will remain at rest.

The same form of distant control may be applied to this mechanism as that already described in connection with the shovel raising and lowering mechanism. This mechanism is shown connected up at the upper left-hand part of Fig. 1, indicated by reference numeral 235, and is shown in detail in Fig. 5, and having been described already, further detailed description is unnecessary. In Figs. 1 and 8, the solenoids and some of the associated parts have the same reference numerals applied thereto as in Fig. 5, but the reference numerals for the shovel raising control have the exponent $a$ affixed thereto and the pusher blade control reference numerals have the exponent $b$ affixed thereto. For example, the solenoid 179 of Fig. 5 as applied to the shovel raising mechanism is marked in Fig. 8 as $179^a$ and for the pusher blade operating mechanism is marked in Fig. 8 as $179^b$, and so for the other parts of the control shown in general detail in Fig. 5.

In Figs. 7 and 8 is shown, more or less diagrammatically, the application of the distant control system of the invention to the machine shown in Figs. 1 to 6.

In Fig. 8 the various solenoids, heretofore described and shown in mechanical connection with the various mechanisms of the material loading, conveying and unloading machine, are indicated by the reference numerals previously applied thereto, that is, solenoids $89^a$ controls the wedge 71 for one of the caterpillar treads, and solenoid $89^b$ controls the wedge 71 for the other caterpillar tread; solenoid $101^a$ controls the brake band 94 for one of the brake bands 40, and solenoid $101^b$ controls the brake band 94 for the other brake ring 40. The designation of the solenoids $179^a$ and $179^b$ and $184^a$ and $184^b$ in Fig. 8 have already been explained.

In the embodied form of distant control, the various circuit wires for the solenoids, and also the power circuit wire 250 for the motor 25, and a common neutral or return wire 251 for all the circuits are preferably made into a cable 252. The cable 252 is wound upon a reel 253, the reel being constructed and mounted to pay off the cable automatically as the controlled machine travels away from the reel and to automatically wind it up as the controlled machine approaches the reel.

As embodied, the reel 253 is mounted loosely on a shaft 254, which is journaled in supports 255 and 256 mounted on a base 257. Any suitable form of automatic reel winding and unwinding mechanism may be used, and as embodied, a spring winding mechanism 258 is shown generally, to operate and control the reel 253 in the manner described. The insulated cable 252 is coiled about the reel 253 to an extent sufficient to provide the maximum range of movement for the controlled machine, and circuit making and breaking mechanisms are provided for controlling the various circuits, to operate the solenoids on the controlled machine to effect the functions and operations described.

As embodied, a hollow cylinder or drum 260 is fixed to or integral with the reel 253, extends outwardly from one side thereof, and is loosely journaled on the shaft 254. A set or series of contact rings are mounted upon and insulated from the drum 260 and in electrical connection therewith are switches by which the various circuits are opened and closed.

The power circuit wire 250 is connected to the contact ring 264. Cooperating with ring 264 is a brush 270 connecting to a supply wire 285, the current being supplied from a trolley wire 265 through a rheostat or starting mechanism 266. The common return wire 251 is shown grounded upon the reel at 267. A common return or negative connection 268 is shown to the track rails 269.

A contact ring 272 (Figs. 7 and 8) is provided with a brush 273, which is connected by a circuit wire 274 to switch points 275. Contact ring 272 is also connected to solenoid $179^b$ of the control for the pusher blade operating mechanism, through circuit wire 276. A contact ring 277 is provided with a brush 278, and connects by a wire 279 to switch points 280. Contact ring 277 also connects through circuit wire 281 to solenoid $184^b$, which solenoid cooperates with solenoid $179^b$ to control the pusher blade operating mechanism, as shown in Fig. 5. A common switch lever 282, cooperating alternatively with switch points 275 and 280, is mounted on a support 283 and through a wire 284 taps the current supply from the trolley wire 265, through wire 285.

Thus, when switch lever 282 is connected with switch points 275, solenoid 179ᵇ is actuated to push the pusher blade 196 in one direction, and when switch lever 282 is connected to switch points 280, solenoid 184ᵇ is actuated to move the pusher blade 196 in the opposite direction. When switch lever 282 is in the neutral position of Fig. 7, both the clutch mechanisms 220, 221 and 231, 232, are disengaged or in neutral position and the pusher blade 196 is at rest.

A contract ring 290 is provided with a brush 291, connected by a wire 292 to switch points 293. Contact ring 290 is also connected by circuit wire 294 to solenoid 179ᵃ of the control device for the shovel raising, lowering and holding mechanism. A contact ring 295 cooperates with a brush 296, connecting by a wire 297 with switch points 298. Contact ring 295 also connects by a circuit wire 289 with solenoid 184ᵃ of the control device for the shovel operating mechanism. A switch lever 299 cooperates alternatively with the switch points 293 or 298, the lever being electrically connected to the circuit supply wire 284.

When switch lever 299 is in engagement with switch points 293, the clutch members 143, 144 or 145, 146 are operated to either raise or lower the shovel, and when switch lever 299 is in engagement with switch points 298, the clutch members operate to move the shovel in the opposite direction. When switch lever 299 is in the position of Fig. 7 both clutch mechanisms are in disengaged or neutral position, and the shovel is held at rest by the worm gear connection 153, 154.

Contact ring 300 has a brush 301 cooperating therewith, and through a wire 302 connects to switch points 303. Contact ring 300 connects also through circuit wire 304 with solenoid 89ᵃ, which is part of the control for the driving mechanism for the left-hand caterpillar tread. A contact ring 305 has a brush 306 cooperating therewith, and connecting by a wire 307 with switch points 308. Contact ring 305 connects also by circuit wire 309 with solenoid 101ᵃ which actuates brake band 94 on the left-hand side of gear wheel 27 in Fig. 3 and which causes the left-hand thread to travel in the opposite direction from solenoid 89ᵃ.

A switch lever 310 is adapted to engage alternatively with switch points 303 or 308, switch lever 310 being in electrical connection with current supply wire 284. When switch lever 310 is in engagement with switch points 303, through solenoid 89ᵃ the wedge 71 at the left hand side of the machine is actuated to drive the caterpillar tread on that side forward. When switch lever 310 is in engagement with switch points 308, through solenoid 101ᵃ, the corresponding brake band 94 is operated to drive the left hand caterpillar tread in the opposite direction.

A contact ring 320 has a brush 321 cooperating therewith, which connects through a circuit wire 322 with switch points 323. Contact ring 320 also connects through circuit wire 324 with solenoid 89ᵇ which operates the wedge 71 of the control mechanism for the right hand caterpillar tread. A contact ring 325 has a brush 326 cooperating therewith, which connects by a wire 327 with switch points 328. Contact ring 325 connects also by a wire 329 with solenoid 101ᵇ of the operating mechanism for the right hand brake band 94 in Fig. 4.

A switch lever 329 cooperates alternatively with switch points 323 and switch points 328. When switch lever 329 is in engagement with switch points 323, solenoid 89ᵇ is energized, and operates wedge 71 of the control mechanism to drive the right hand caterpillar tread forwardly. When switch lever 329 is in engagement with switch points 328, solenoid 101ᵇ is energized and the corresponding brake band 94 is operated to drive the right hand caterpillar tread in the backward direction.

The manner of operation of the mechanism described may be summarized as follows:—

The control mechanism may be set in any convenient place and the motor 25 of the controlled machine (in the present instance the loading, conveying and unloading machine) may be started by using the resistance box 266. By closing switch connections 303 and 323, by means of levers 310 and 329, respectively, both treads will move the machine in the forward direction. By closing switch connections 308 and 328, both treads will move the machine in the backward direction.

By closing switch connections 303 and 328 the two treads will move the machine in opposite directions and it will wheel in its own length, and by closing switch connections 308 and 323 the machine will wheel in the opposite direction. By leaving either lever 310 or 329 in the neutral position and throwing the other lever into either of its circuit closing positions, either of the treads can be held at rest and the other tread can be operated in either the forward or backward direction to effect corresponding movement of the controlled machine.

The operation of switch lever 299 to raise or lower the shovel has already been fully explained, as has also the operation of switch lever 282 to operate the pusher blade. It will be observed that the connections are arranged so that none of the switches can be thrown to cause conflicting movements of any of the mechanisms.

By way of further example, and assuming that it is desired to take a load say of coal lying on the mine bottom and to convey it to another place, switch levers 310 and 329 can be thrown to advance the machine and drive the shovel 190 along the bottom into a pile of coal. Switch lever 299 can then be thrown to raise the shovel slightly and then be thrown out to hold the shovel at rest just clear of the bottom.

Levers 310 and 329 can then be thrown to back the machine to bring the loaded shovel out of the pile, and may then be operated as already described to steer or direct the course of the shovel along a tortuous path, if necessary, to avoid roof props or other obstacles to a place of delivery. Lever 299 may be thrown to lift the shovel, as in case it is desired to unload into a mine car.

Lever 282 can be thrown in one direction to cause the pusher blade 196 to push the load from the shovel and then in the opposite direction to draw the pusher blade again to the rear of the shovel 190, and is then moved back to neutral position. Lever 299 may then be thrown to bring the shovel down to its bottom position, and levers 310 and 329 may be operated to steer the machine as already described.

Slip or friction drives may be used on the various shafts, but have been omitted from the drawings for the sake of clearness, as they are a usual mechanical expedient and their use is common and well known.

When it is desired to convey the control mechanism from one place to another, by manipulating the control levers, the shovel can be slid beneath the base 257 of the control mechanism. The shovel may then be slightly elevated carrying the control, and the machine may be driven and steered by the control levers, and the control mechanism may be conveyed to and deposited at any desired place.

The operated machine may be directed and controlled from this new point as already described. It will also be clear that the control system is capacitated to control other automotive machines than the one illustrated and explained herein by way of example.

The invention in its broader aspects is not limited to the specific mechanisms shown and described but departures may be made therefrom within the scope of the accompanying claims without departing from the principles of the invention and without sacrificing its chief advantages.

What I claim is:—

1. A material carrying, loading and unloading machine including in combination a shovel at the front of the machine, a pair of shovel supporting arms pivoted on the machine, a cable attached to the shovel, a drum on the machine for winding and unwinding the cable to raise, to support and to lower the shovel, means for driving the drum, endless traction treads for the machine, and means for driving the treads forwardly or backwardly.

2. A material carrying, loading and unloading machine including in combination a shovel at the front of the machine endless traction treads at either side of the machine, a pair of shovel supporting arms pivoted on the machine, a cable attached to the shovel, a drum on the machine for winding and unwinding the cable to raise, to support and to lower the shovel, and a common power means for driving the traction treads and the drum and means for holding the cable and shovel in any desired position.

3. A material carrying, loading and unloading machine including in combination a shovel at the front of the machine, endless traction treads for the machine, a pair of shovel supporting arms pivoted on the machine, a cable attached to the shovel, a drum on the machine for winding and unwinding the cable to raise, to support and to lower the shovel, a motor for driving the drum and the traction treads, and means connecting the traction treads to the motor for driving them independently or together.

4. A material carrying, loading and unloading machine including in combination a shovel at the front of the machine, endless traction treads for the machine, a pair of shovel supporting arms pivoted on the machine, a cable attached to the shovel, a drum on the machine for winding and unwinding the cable to raise, to support and to lower the shovel, and a motor for driving the drum and the traction treads, connections operatively connecting the motor with the drum and the traction treads, including a direction reversing mechanism.

5. A material carrying, loading and unloading machine including in combination a shovel at the front of the machine, endless traction treads for the machine, a pair of shovel supporting arms pivoted on the machine, a cable attached to the shovel, a drum on the machine for winding and unwinding the cable to raise, to support and to lower the shovel, a motor for driving the drum, and connections from the motor to the drum, including a worm and worm wheel.

6. A material carrying loading and unloading machine including in combination a shovel at the front of the machine, endless traction treads for the machine, a pair of shovel supporting arms pivoted on the machine, a cable attached to the shovel, a drum on the machine for winding and unwinding the cable to raise, to support and to lower the shovel, a motor for driving the drum and the traction treads, and connections from the motor to the drum, including a worm and worm wheel, and direction reversing mechanism.

7. A material carrying, loading and unloading machine including in combination a shovel at the front of the machine, a pair of shovel supporting arms pivoted on the machine, a pusher blade within the shovel, and means connected to the blade and mounted on said arms for moving the pusher blade to and fro in the shovel.

8. A material carrying, loading and unloading machine including in combination a shovel at the front of the machine, a pair of shovel supporting arms pivoted on the machine, a pusher blade within the shovel, and a pair of rods connected at one of their ends to the pusher blade and at the other end movably mounted on said arms, respectively, and means for moving said rods along said arms to move the pusher blade to and fro within the shovel.

9. A material carrying, loading and unloading machine including in combination a shovel at the front of the machine, a pair of shovel supporting arms pivoted on the machine, a pusher blade within the shovel, and a pair of rods pivoted at one of their ends to the pusher blade, a member mounted on each of said arms and movable therealong, and means for moving said members to and fro along said arms to move the pusher blade to and fro in the shovel.

10. A material carrying, loading and unloading machine including in combination a shovel at the front of the machine, a pair of shovel supporting arms pivoted on the machine, a pusher blade within the shovel, and a pair of rods pivoted at one of their ends to the pusher blade, a sprocket chain arranged along each of said arms, the ends of said rods being connected respectively to said sprocket chains, and means for traveling the sprocket chains to and fro to move the pusher blade to and fro within the shovel.

11. A material carrying, loading and unloading machine including in combination a shovel, a pusher blade adapted to travel to and fro therewithin, a sprocket chain mounted on the machine, and connections from the sprocket chain to the blade to reciprocate the blade to and fro within the shovel.

12. A material carrying, loading and unloading machine including in combination a shovel, a pusher blade adapted to travel to and fro therewithin, a sprocket chain mounted on the machine, and connections from the sprocket chain to the blade to reciprocate the blade to and fro within the shovel including means for reversing the direction of travel of the sprocket chain.

13. A material carrying, loading and unloading machine including in combination a shovel, a pusher blade adapted to travel to and fro therewithin, a sprocket chain mounted on the machine, and connections from the sprocket chain to the blade to reciprocate the blade to and fro within the shovel including a motor and connections therefrom for driving the sprocket chain and a reversing device in said connections.

14. A material carrying, loading and unloading machine including in combination traction means for the machine, a shovel adapted to travel with the machine to take on its load, means for raising and lowering the shovel, a motor, a common drive from the motor for the traction means and the shovel raising and lowering means and means for controlling the operation of the traction means and the shovel raising and lowering means from a point distant from the machine.

15. A material carrying, loading and unloading machine including in combination traction means for the machine, a shovel traveling with the machine to take on its load, means for raising and lowering the shovel, a motor and a common drive from the motor for the traction means and the shovel raising and lowering means, and devices controlled from a point distant from the machine for selectively throwing in and out each of said means.

16. A material carrying, loading and unloading machine including in combination traction means for the machine, a shovel traveling with the machine to take on its load, means for raising and lowering the shovel, a motor and a common drive from the motor for the traction means and the shovel raising and lowering means, and devices controlled from a point distant from the machine for selectively and independently throwing in and out each of said means.

17. A material carrying, loading and unloading machine including in combination traction means for the machine, a shovel traveling with the machine to take on its load, means for raising and lowering the shovel, a motor, a continuously running common drive from the motor for the traction means and the shovel raising and lowering means and means for controlling the operation of the traction means and the shovel raising and lowering means from a point distant from the machine.

18. A material carrying, loading and unloading machine including in combination traction means for the machine, a shovel traveling with the machine to take on its load, means for raising and lowering the shovel, a motor and a continuously running common drive from the motor for the traction means and the shovel raising and lowering means, and devices controlled from a point distant from the machine for selectively throwing in and out each of said means.

19. An automotive machine and a distant control therefore, including in combination, direction reversible traction means on the machine, material handling mechanism mounted on the machine, and electrically operated means separated from the machine for controlling the traction means and material handling mechanism.

20. An automotive machine and a distant control therefore, including in combination, direction reversible traction means on the machine, material handling mechanism mounted on the machine, and electrically operated means separated from the machine for starting and stopping the traction means and material handling mechanism.

21. An automotive machine and a distant control therefor, including in combination, direction reversible traction means on the machine, material handling mechanism mounted on the machine, and electrically operated means separated from the machine for reversing the direction of the traction means and material handling mechanism.

22. An automotive machine and a distant control therefore, including in combination, direction reversible traction means on the machine, material handling mechanism mounted on the machine, and stationary electrically operated means separated from the machine for controlling the traction means and material handling mechanism.

23. An automotive machine and a distant control therefor, including in combination, direction reversible traction means on the machine, material handling mechanism mounted on the machine, and electrically operated means separated from the machine for controlling the traction means and material handling mechanism, a cable connecting the controlling means and machine, and means automatically winding and paying out the cable as the machine approaches and recedes from the controlling means.

24. An automotive material handling machine and distant control therefore including in combination a shovel on the machine, traction means at each side of the machine to travel the machine to drive the shovel into the material and to withdraw it therefrom, and electrically operated means separated from the machine for independently controlling said traction means.

25. An automotive material handling machine and distant control therefor including in combination a shovel on the machine, traction means to travel the machine to drive the shovel into the material and to withdraw it therefrom, and electrically operated means separated from the machine for independently controlling said traction means.

26. An automotive material handling machine and distant control therefor including in combination a shovel on the machine, traction means at each side of the machine to travel the machine to drive the shovel into the material and to withdraw it therefrom, and stationary electrically operated means separated from the machine for independently controlling said traction means.

27. An automotive material handling machine and distant control therefore including in combination a shovel on the machine, traction means to travel the machine to drive the shovel into the material and to withdraw it therefrom, and stationary electrically operated means separated from the machine for independently controlling said traction means.

28. An automotive material handling machine and distant control therefor including in combination a shovel on the machine, means for raising and lowering the shovel, and an electrically operated control for said means separated from the machine.

29. An automotive material handling machine and distant control therefor including in combination a shovel on the machine, means for raising and lowering the shovel, and a stationary electrically operated control for said means separated from the machine.

30. An automotive material handling machine and distant control therefor including in combination a shovel on the machine, means for operating the shovel, and an electrically operated control for said means separated from the machine.

31. An automotive material handling machine and distant control therefor including in combination a shovel on the machine, means for operating the shovel, and a stationary electrically operated control for said means separated from the machine.

32. An automotive material handling machine and distant control therefor including in combination a shovel on the machine, a pusher blade in the shovel, means for operating the pusher blade, means for raising and lowering the shovel, and an electrically operated control for said means separated from the machine.

33. An automotive material handling machine and distant control therefor including in combination a shovel on the machine, a pusher blade in the shovel, means for operating the pusher blade, means for raising and lowering the shovel, and a stationary electrically operated control for said means separated from the machine.

34. An automotive machine and a distant control therefor, including in combination direction reversible traction means on the machine, material handling means carried on the machine, electro-magnet controlling means for the traction means and material handling means located on the machine, and current controlling means separated from the machine for said electro-magnetic means.

35. An automotive machine and a distant control therefor, including in combination direction reversible traction means on the machine, material handling means carried on the machine, electro-magnetic controlling means for the traction means and material handling means located on the machine, and stationary current controlling means separated from the machine for said electro-magnetic means.

36. An automotive machine and a distant control therefor, including in combination, direction reversible traction means on the machine, material handling means carried on the machine, electro-magnetic controlling means for the traction means and material handling means located on the machine, and current controlling means separated from the machine, including a plurality of switches and circuits, for said electro-magnetic means.

37. An automotive machine and a distant control therefor, including in combination, direction reversible traction means on the machine, material handling means carried on the machine, electro-magnetic controlling means for the traction means and material handling means located on the machine, and stationary current controlling means separated from the machine, including a plurality of switches and circuits, for said electro-magnetic means.

38. An automotive machine and a distant control therefor, including in combination, direction revisible traction means on the machine, material handling means carried on the machine, electro-magnetic controlling means for the traction means and material handling means located on the machine, and stationary current controlling means separated from the machine for said electro-magnetic means, circuit wires between the machine and the controlling means and automatically operating means for winding and paying out the wires as the machine approaches and recedes from the control.

39. A material handling machine comprising in combination a continuously driven element, endless traction treads, a shovel at the front of the machine pivoted to move on a horizontal, transverse axis at the rear of the machine, and means for independently and intermittently actuating the traction treads and the shovel from the continuously driven element.

40. A material handling machine comprising in combination a continuously driven element, endless traction treads, means for intermittently driving the traction treads in either direction from the continuously driven element, a shovel at the front of the machine pivoted to move on a horizontal, transverse axis at the rear of the machine, and means for connecting the continuously driven element to the shovel at will.

41. A material handling machine comprising in combination a continuously driven element, endless traction treads, a shovel at the front of the machine pivoted to move on a horizontal transverse axis at the rear of the machine, a pusher blade for the shovel, and means for independently and intermittently actuating the traction treads and the pusher blade from the continuously driven element.

42. A material handling machine comprising in combination a continuously driven element, endless traction treads, a shovel at the front of the machine pivoted to move on a horizontal transverse axis at the rear of the machine, a pusher blade therefor, means for intermittently driving the traction treads in either direction from the continuously driven element, and means for actuating the pusher blade from the continuously driven element.

43. A material handling machine comprising in combination a continuously driven element, endless traction treads, a shovel at the front of the machine pivoted to move on a horizontal, transverse axis at the rear of the machine, and means controlled from a point distant from the machine for independently and intermittently actuating the traction treads and the shovel from the continuously driven element.

44. A material handling machine comprising in combination a continuously driven element, endless traction treads; means for intermittently driving the traction treads in either direction from the continuously driven element, a shovel at the front of the machine pivoted to move on a horiontal axis at the rear of the machine, and means for connecting the continuously driven element to the shovel at will, both said means being controlled from a point distant from the machine.

45. A material handling machine comprising in combination a continuously driven element, endless traction treads, a shovel at the front of the machine pivoted to move on a horizontal transverse axis at the rear of the machine, a pusher blade for the shovel, and means controlled from a point distant from the machine for independently and intermittently actuating the traction treads and the pusher blade from the continuously driven element.

46. A material handling machine comprising in combination a continuously driven element, endless traction treads, a shovel at the front of the machine pivoted to move on a horizontal transverse axis at the rear of the machine, a pusher blade therefor, means for intermittently driving the traction treads in either direction from the continuously driven element, and means for actuating the pusher blade from the continuously driven element both said means being controlled from a point distant from the machine.

47. A material handling machine comprising in combinatioin a continuously driven element, endless traction treads, a shovel at the front of the machine, means concentric with the continuously driven element and driven thereby, for driving the traction treads, and means driven by the continuously driven element for actuating the shovel.

48. A material handling machine comprising in combination a continuously driven element, endless traction treads, a shovel at the front of the machine, means concentric with the continuously driven element and driven thereby, for driving the traction treads either forwardly or backwardly, and means, driven by the continuously driven element, for actuating the shovel.

49. A material handling machine comprising in combination a continuously driven element, endless traction treads, a shovel at the front of the machine, means concentric with the continuously driven element and driven thereby, for driving the traction treads forwardly or backwardly, independently or together, and means, driven by the continuously driven element, for actuating the shovel.

50. A material handling machine comprising in combination endless traction treads, a shovel at the front of the machine, a pair of rotatable concentric elements, one of which is continuously driven, means for operatively connecting said two elements together at will, means for connecting one of said elements to drive the traction treads, and means for connecting the other of said elements to actuate the shovel.

51. A material handling machine comprising in combination endless traction treads, a shovel at the front of the machine, a pair of rotatable concentric elements, one of which is continuously driven, means including devices for reversing the direction of rotation, for operatively connecting said two elements together at will, means for connecting one of said elements to drive the traction treads, and means for connecting the other of said elements to actuate the shovel.

52. A material handling machine comprising in combination endless traction treads, a shovel having a pusher blade at the front of the machine, a pair of rotatable concentric elements, one of which is continuously driven, means for operatively connecting said two elements together at will, means for connecting one of said elements to drive the traction treads, and means for connecting the other of said elements to actuate the shovel or the pusher blade.

53. A material handling machine comprising in combination a continuously driven element, endless traction treads, a shovel at the front of the machine, means concentric with the continuously driven element and driven thereby, for driving the traction treads, means driven by the continuously driven element, for actuating the shovel and means, operable from a point distant from the machine, for controlling the operation of the traction treads and shovel.

54. A material handling machine comprising in combination a continuously driven element, endless traction treads, a shovel at the front of the machine, means concentric with the continuously driven element and driven thereby, for driving the traction treads either forwardly or backwardly, means, driven by the continuously driven element, for actuating the shovel, and means, operable from a point distant from the machine for controlling the operation of the traction treads and shovel.

55. A material handling machine comprising in combination a continuously driven element, endless traction treads, a shovel at the front of the machine, means concentric with the continuously driven element and driven thereby, for driving the traction treads forwardly or backwardly independently or together, means, driven by the continuously driven element, for actauting the shovel, and means, operable from a point distant from the machine, for controlling the operation of the traction treads and shovel.

56. A material handling machine comprising in combination endless traction treads, a shovel at the front of the machine, a pair of rotatable concentric elements, one of which is continuously driven, means for operatively connecting said two elements together at will, means for connecting one of said elements to drive the traction treads, means for connecting the other of said elements to actuate the shovel, and means, operable from a point distant from the machine, for controlling the operation of the traction treads and shovel.

57. A material handling machine comprising in combination endless traction treads, a shovel at the front of the machine, a pair of rotatable concentric elements, one of which is continuously driven, means including devices for reversing the direction of rotation, for operatively connecting said two elements together at will, means for connecting one of said elements to drive the traction treads, means for connecting the other of said elements to actuate the shovel, and means, operable from a point distant from the machine, for controlling the operation of the traction treads and shovel.

58. A material handling machine comprising in combination endless traction treads, a shovel, having a pusher blade, at the front of the machine, a pair of rotatable concentric elements, one of which is continuously driven, means for operatively connecting said two elements together at will, means for connecting one of said elements to drive the traction treads, means for connecting the other of said elements to actuate the shovel or the pusher blade, and means operable from a point distant from the machine, for controlling the operation of the traction treads, the shovel and the pusher blade.

59. A material handling machine comprising in combination a frame, traction means carried by the frame, a shovel carried at the front of the frame, a continuously running motor, a continuously running gear wheel driven thereby, a shaft connected to rotate with the gear wheel, clutch means operatively connecting said gear wheel and the traction means, and clutch means operatively connecting said shaft and the shovel.

60. A material handling machine comprising in combination a frame, traction means carried by the frame, a shovel carried at the front of the frame, a continuously running motor, a continuously running gear wheel driven thereby, a shaft connected to rotate with the gear wheel, a sleeve concentric with the shaft, direction reversing means cooperating with the gear wheel and sleeve for driving the sleeve in either direction, and means operatively connecting the sleeve and the traction means.

61. A material handling machine comprising in combination a frame, traction means carried by the frame, a shovel carried at the front of the frame, a continuously running motor, a continuously running gear wheel driven thereby, a shaft connected to rotate with the gear wheel, a sleeve concentric with the shaft, direction reversing means cooperating with the gear wheel and sleeve for driving the sleeve in either direction, means operatively connecting the sleeve and the traction means, and clutch means operatively connecting said shaft and the shovel.

62. A material handling machine comprising in combination a frame, traction means carried by the frame, a shovel carried at the front of the frame, a continuously running motor, a continuously running gear wheel driven thereby, a shaft connected to rotate with the gear wheel, but movable longitudinally with respect thereto, and driven means connected to the traction means and connected to and disconnected from the gear wheel by said longitudinal movement thereof.

63. A material handling machine comprising in combination a frame, traction means carried thereby, a shovel at the front of the frame, a continuously running motor, a continuously running gear wheel driven by the motor, a shaft connected to rotate with the gear wheel but movable longitudinally with respect thereto, clutch means operatively connecting the gear wheel and the traction means, and clutch means operatively connecting said shaft and the shovel.

64. A material handling machine comprising in combination a frame, traction means carried thereby, a shovel at the front of the frame, a continuously running motor, a continuously running gear wheel driven by the motor, a shaft connected to rotate with the gear wheel but movable longitudinally with respect thereto, a sleeve concentric with the shaft, direction reversing means cooperating with the gear wheel and sleeve for driving the sleeve in either direction, and means operatively connecting the sleeve and the traction means.

65. A material handling machine comprising in combination a frame, traction means carried thereby, a shovel at the front of the frame, a continuously running motor, a continuously running gear wheel driven by the motor, a shaft connected to rotate with the gear wheel but movable longitudinally with respect thereto, a sleeve concentric with the shaft, direction reversing means cooperating with the gear wheel and sleeve for driving the sleeve in either direction, means operatively connecting the sleeve and the traction means, and clutch means operatively connecting said shaft and the shovel.

66. A material carrying, loading and unloading machine including in combination a frame, a shovel at the front of the frame, endless traction treads on either side of the frame, and to the rear of the shovel, and means for controlling the operation of the traction treads from a point distant from the machine.

67. A material carrying, loading and unloading machine including in combination a frame, a shovel at the front thereof, endless traction treads at the side thereof to the rear of the shovel, a pusher blade for the shovel, and means for controlling the operation of the pusher blade from a point distant from the machine.

68. A material carrying, loading and unloading machine including in combination a frame, a shovel at the front thereof, endless traction treads at the side thereof, a pusher blade for the shovel, and means for controlling the operation of the traction treads and the pusher blade from a point distant from the machine.

69. A material carrying, loading and unloading machine including in combination a frame, a shovel at the front of the frame, endless traction treads on either side of the frame, and to the rear of the shovel, and means for individually controlling the operation of the traction treads from a point distant from the machine.

70. A material carrying, loading and unloading machine including in combination a frame, a shovel at the front thereof, endless traction treads alongside the frame, a pusher blade for the shovel, means for individually controlling the operation of the traction treads from a point distant from the machine, and means for controlling the operation of the pusher blade from a point distant from the machine.

71. A material carrying, loading and unloading machine including in combination a frame, a shovel at the front of the frame, means for supporting the shovel substantially at the floor level, just escaping contact with the floor, endless traction treads at either side of the frame, and means, controllable from a point distant from the machine, for raising and lowering the shovel, and for operating the traction treads.

72. A material carrying, loading and unloading machine including in combination a frame, endless traction treads alongside the frame, a shovel at the front of the frame substantially as wide as the overall width of the two traction treads, a pusher blade for the shovel, and means for controlling the operation of the traction treads and of the pusher blade from a point distant from the machine.

73. A material carrying, loading and unloading machine including in combination a frame, a motor on the frame, a shovel at the front thereof, traction treads alongside the frame, and means including electromagnetically operated clutches controlled from a point distant from the machine for operatively connecting and disconnecting the motor and the traction treads.

74. A material carrying, loading and unloading machine including in combination a frame, a shovel at the front thereof, a motor carried by the frame, traction treads at either side of the frame, and means including electromagnetically operated clutches controlled from a point distant from the machine for selectively connecting the motor to, and disconnecting it from, the traction treads.

75. A material carrying, loading and unloading machine including in combination a frame, a shovel at the front thereof, a motor carried by the frame, traction treads at either side of the frame, means including electromagnetically operated clutches controlled from a point distant from the machine for selectively connecting the motor to, and disconnecting it from, the traction treads, and means including electromagnetically operated clutches controlled from a point distant from the machine, for controlling the operation of the shovel.

76. A material carrying, loading and unloading machine including in combination a frame, a shovel at the front thereof, a motor carried by the frame, endless traction treads alongside the frame, a pusher blade for the shovel, means including electromagnetically operated clutches for operatively connecting and disconnecting the motor and the traction treads, and means including electromagnetically operated clutches controlled from a point distant from the machine, for controlling the operation of the traction treads, the shovel and the pusher blade.

In testimony whereof, I have signed my name to this specification.

KENNETH DAVIS.